(12) United States Patent
Yagi

(10) Patent No.: US 7,454,613 B2
(45) Date of Patent: Nov. 18, 2008

(54) INFORMATION PROCESSING APPARATUS, SESSION RECOVERY METHOD, RECORDING MEDIUM FOR STORING SESSION RECOVERY PROGRAM

(75) Inventor: Atsuko Yagi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 840 days.

(21) Appl. No.: 10/914,137

(22) Filed: Aug. 10, 2004

(65) Prior Publication Data

US 2005/0066196 A1    Mar. 24, 2005

(30) Foreign Application Priority Data

Aug. 18, 2003 (JP) .............................. 2003-294422
Jun. 18, 2004 (JP) .............................. 2004-181383

(51) Int. Cl.
  *G06F 9/00* (2006.01)
(52) U.S. Cl. .................. 713/167; 713/168; 713/182
(58) Field of Classification Search ................. 713/168, 713/167, 182
See application file for complete search history.

(56) References Cited

U.S. PATENT DOCUMENTS

| 6,018,805 A | 1/2000 | Ma et al. |
| 6,362,836 B1 | 3/2002 | Shaw et al. |
| 6,490,610 B1 | 12/2002 | Rizvi et al. |
| 2002/0029269 A1 | 3/2002 | McCarty et al. |
| 2003/0221170 A1 | 11/2003 | Yagi |
| 2004/0143795 A1 | 7/2004 | Matsuishi |

FOREIGN PATENT DOCUMENTS

| JP | 5-120232 | 5/1993 |
| JP | 2003-50761 | 2/2003 |
| WO | WO 01/61521 A1 | 8/2001 |

*Primary Examiner*—Thomas R Peeso
(74) *Attorney, Agent, or Firm*—Oblon, Spivak, McClelland, Maier & Neustadt, P.C.

(57) ABSTRACT

An information processing apparatus, a session recovery method and a recording medium for storing a session recovery program are disclosed. According to one aspect of the present invention, even if a session with a server apparatus connected via a network is invalidated, it is possible to resume the session without user's recognition of the session invalidation. The information processing apparatus includes an authentication information maintain part maintaining authentication information supplied to establish the session, a session invalidation detection part detecting that the session is invalidated, and a session recovery part, when the session invalidation detection part detects that the session has been invalidated, requesting the server apparatus to establish a session by using the authentication information in the authentication information maintain part.

12 Claims, 16 Drawing Sheets

FIG.8

| SERVICE NAME | USER NAME | PASSWORD |
|---|---|---|
| DOCUMENT MANAGEMENT SERVICE 21 | AAA | xxxxxxxx |
| | | |
| | | |

| SERVICE NAME | METHOD NAME | ARGUMENT INFORMATION |
|---|---|---|
| DOCUMENT MANAGEMENT SERVICE 21 | DOCUMENT LIST ACQUISITION METHOD | xxxxxxxx |
| | | ... |

INFORMATION PROCESSING APPARATUS, SESSION RECOVERY METHOD, RECORDING MEDIUM FOR STORING SESSION RECOVERY PROGRAM

BACKGROUND OF THE INVENTION

1. Field of the Invention

The present invention relates to an information processing apparatus that can establish a The present invention relates to an session with a sever apparatus and cause the server apparatus to perform a predetermined operation based on the session.

2. Description of the Related Art

Typically, a recent Web system has a structure as shown in FIG. 1. FIG. 1 shows an exemplary system structure of a typical Web system.

Referring to FIG. 1, a Web system 500 includes a Web client 501, a Web server 502 and application servers 503 and 504, which are connected to each other via networks.

The Web client 501 may be a terminal, such as a personal computer (PC), having a Web browser. The Web server may be a Web server that, in response to receipt of a request from the Web client 501, can generate a Web page and send the generated Web page to the Web client 501.

The application servers 503 and 504 may be servers, into which operation logics are installed, that, in response to receipt of a request from the Web server 502, can perform an operation related to the operation logics and provide the operation result to the Web server 502.

It is noted that sessions are established between the Web client 501 and the Web server 502 and between the Web server 502 and the application servers 503 and 504, where there are network boundaries, so as to maintain process consistency.

In order to open a session, a user typically needs to be authenticated. For example, a user is requested to input the user name and the associated password at time of the first access to the application server 503 or 504.

However, in order to ensure security and reduce load on a machine, when a predetermined time period has passed since a session starts, the session may be invalidated due to timeout. Thus, if the Web server 502, in response to receipt of a request from the Web client 501, establishes sessions with the application servers 503 and 504, for example, the session with the application server 504 may be timed out during exchange with the application server 503.

In such a case, if the Web server 502 subsequently issues a process request to the application server 504, the Web server 502 would receive a timeout error from the application server 504. As a result, the Web server 502 may not be allowed to continue the process. Alternatively, a user of the Web client 501 may be required to input the user name and the associated password.

On the other hand, even if the session is resumed, another problem may occur in a case where a process to be executed after the recovery depends on an execution result of the corresponding process before invalidation of the session. For example, if the process after recovery is for further narrowing down a previous search result, a user is requested to manipulate the Web client 501 to execute the underlying process, for example, to instruct the Web client 501 to perform the previous search, one more time. The reason is why the result of the underlying process is cleared at the same time as the session invalidation.

In order to overcome the above problems, Japanese Laid-Open Patent Application No. 05-120232 relates to recovery of a temporary file in case of session fault in a time-sharing system. Japanese Laid-Open Patent Application No. 2003-050761 discloses a technique whereby even if a session to receive video or sound information is separated, the remaining portion of the information after the separation can be received.

However, these patent applications do not aim at the problem that a user is required to input authentication information again at time of session recovery or the problem that a user is required to manipulate for one or more operations executed before invalidation of the session.

SUMMARY OF THE INVENTION

It is a general object of the present invention to provide an information processing apparatus, a session recovery method and a recording medium for storing a session recovery program in which one or more of the above-mentioned problems are eliminated.

A more specific object of the present invention is to provide an information processing apparatus, a session recovery method and a recording medium for storing a session recovery program that, even if a session with a server apparatus connected via a network is invalidated, can resume the session without user's recognition of the session invalidation.

In order to achieve the above-mentioned objects, there is provided according to one aspect of the present invention an information processing apparatus for establishing a session with a server apparatus connected thereto via a network and communicating to the server apparatus based on the session, including: an authentication information maintain part maintaining authentication information supplied to establish the session; a session invalidation detection part detecting that the session is invalidated; and a session recovery part, when the session invalidation detection part detects that the session has been invalidated, requesting the server apparatus to establish a session by using the authentication information in the authentication information maintain part.

According to one aspect of the invention, the information processing apparatus holds authentication information, such as a user name and a password, used to establish a session with a server apparatus. As a result, even if the session is invalidated, the information processing apparatus can establish the session with the server apparatus again by suing the maintained authentication information. Therefore, it is possible to resume the session without user's recognition of the session invalidation.

Additionally, in order to eliminate one or more of the above-mentioned problems, a session recovery method for the information processing apparatus and a recording medium for storing a program to cause a computer to execute the session recovery method are provided.

Other objects, features and advantages of the present invention will become more apparent from the following detailed description when read in conjunction with the accompanying drawings.

BRIEF DESCRIPTION OF THE DRAWINGS

FIG. 8 shows an exemplary data structure of an account management table according to the first embodiment;

FIG. 14 shows an exemplary data structure of a call history management table according to the second embodiment;

DETAILED DESCRIPTION OF THE PREFERRED EMBODIMENTS

In the following, embodiments of the present invention will be described with reference to the accompanying drawings.

Figure 1:
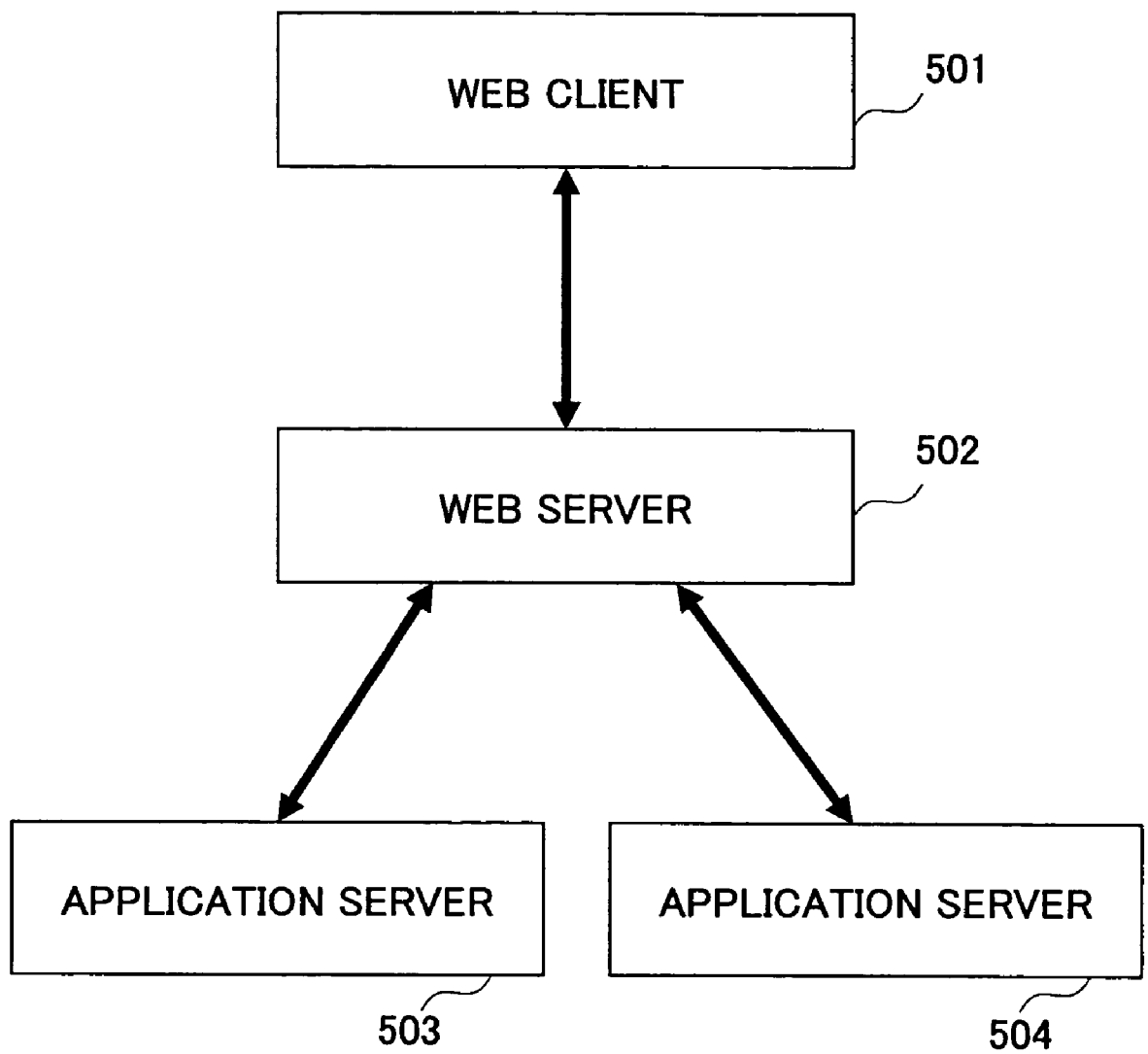
FIG. 1 shows an exemplary system structure of a conventional Web system.
Figure 2:
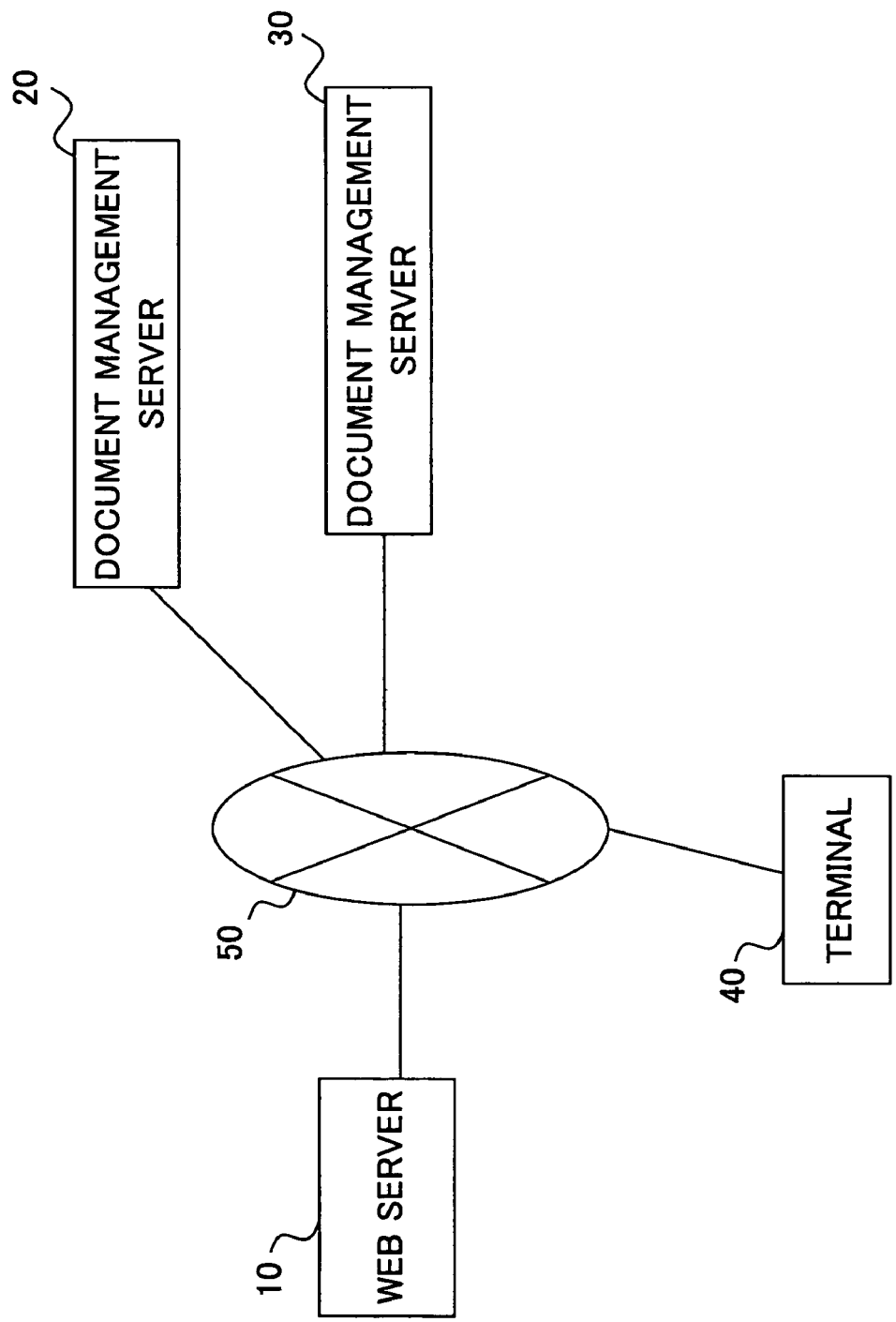
FIG. 2 shows an exemplary system structure of a document management system according to an embodiment of the present invention.

FIG. 2 shows an exemplary system structure of a document management system according to an embodiment of the present invention.

Referring to FIG. 2, a document management system 1 includes a Web server 10, document management servers 20 and 30, and a terminal 40. These components are connected in wired or wireless form to each other via a network 50 such as the Internet and a local area network (LAN).

The Web server 10 may be a computer having a function to provide the terminal 40 with a Web page including information requested by the terminal 40. It is noted that the term "Web page" used herein represents HTML (HyperText Markup Language) or XML (extensible Markup Language) data that an ordinary Web browser can display. When providing a Web page to the terminal 40, the Web server 10 uses the document management server 20 or 30 as needed.

The document management servers 20 and 30 may be computers, into which document databases are installed to manage document information (actual data and property information of document data), that provide various functions, such as registration, search and update of document information, as Web services (document management services via the network 50. In this embodiment, although the document management servers 20 and 30 have similar functions each other, the document management servers 20 and 30 may have different contents of document information.

The terminal 40 may be a communication terminal, such as PC, PDA (Personal Digital Assistant) and a cellar phone, having a Web browser that enables a user to view a Web page supplied from the Web server 10.

Figure 3:
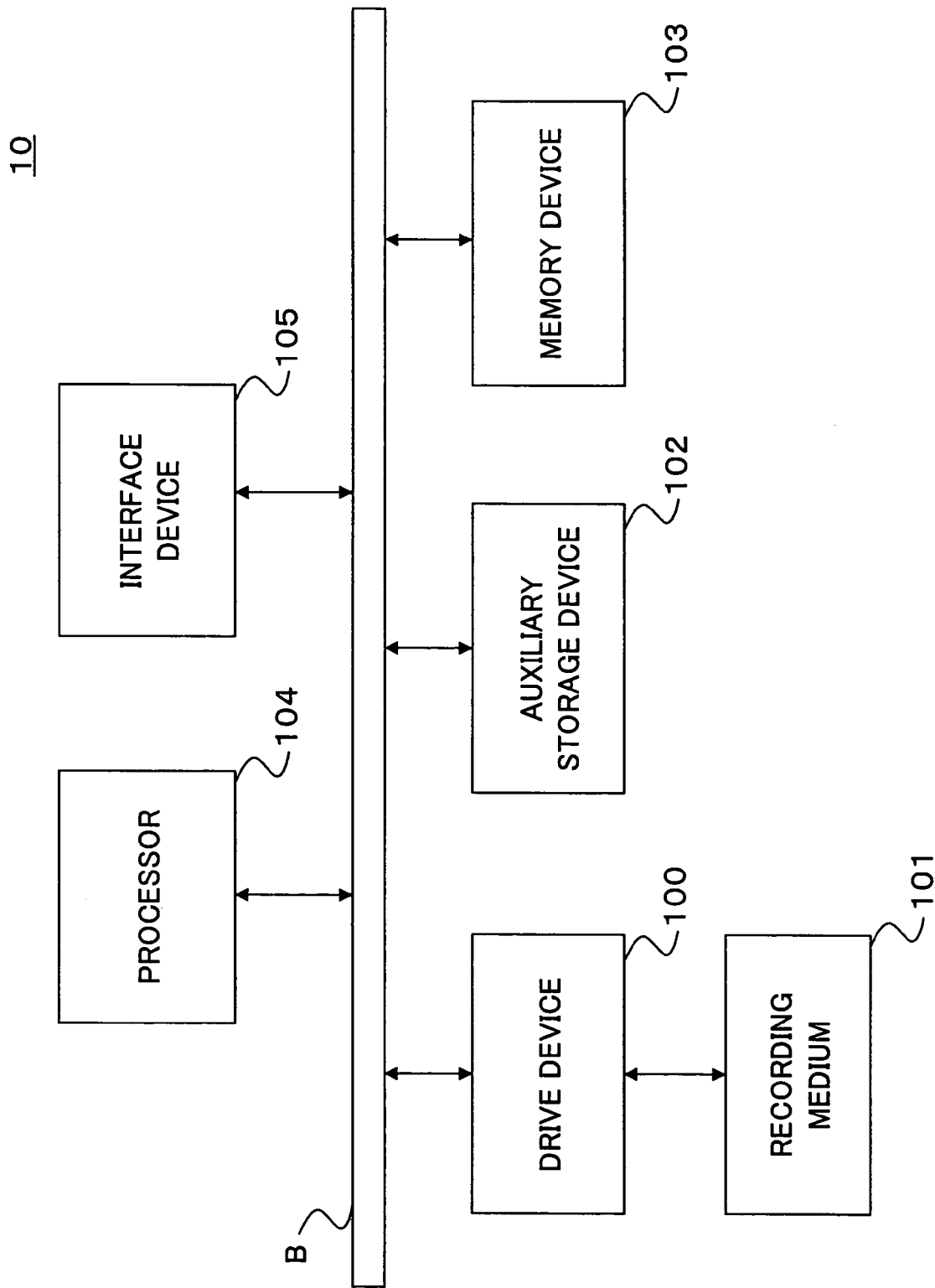
FIG. 3 shows an exemplary hardware configuration of a Web server according to an embodiment of the present invention.

Next, the Web server 10 is described in detail. FIG. 3 shows an exemplary hardware configuration of the Web server 10 according to an embodiment of the present invention.

Referring to FIG. 3, the Web server 10 includes a drive device 100, an auxiliary storage device 102, a memory device 103, a processor 104 and an interface device 105, which are connected to each other via a bus B.

A program to implement operations of the Web server 10 is provided from recording medium 101, such as CD-ROM. When the recording medium 101 having a program is loaded to the drive device 100, the program is installed from the recording medium 101 to the auxiliary storage device 102 via the drive device 100.

The auxiliary storage device 102 stores such an installed program as well as necessary files and data. For example, the auxiliary storage device 102 stores a table, as described below, necessary to execute the program.

When an instruction to start a program is issued, the memory device 103 reads the program from the auxiliary storage device 102 and stores the program therein. The processor 104 executes functions associated with the Web server 10 in accordance with a program stored in the memory device 103. The interface device 105, for example, which is configured as a modem or a router, may be used to connect to the network 50 shown in FIG. 2.

Figure 4:
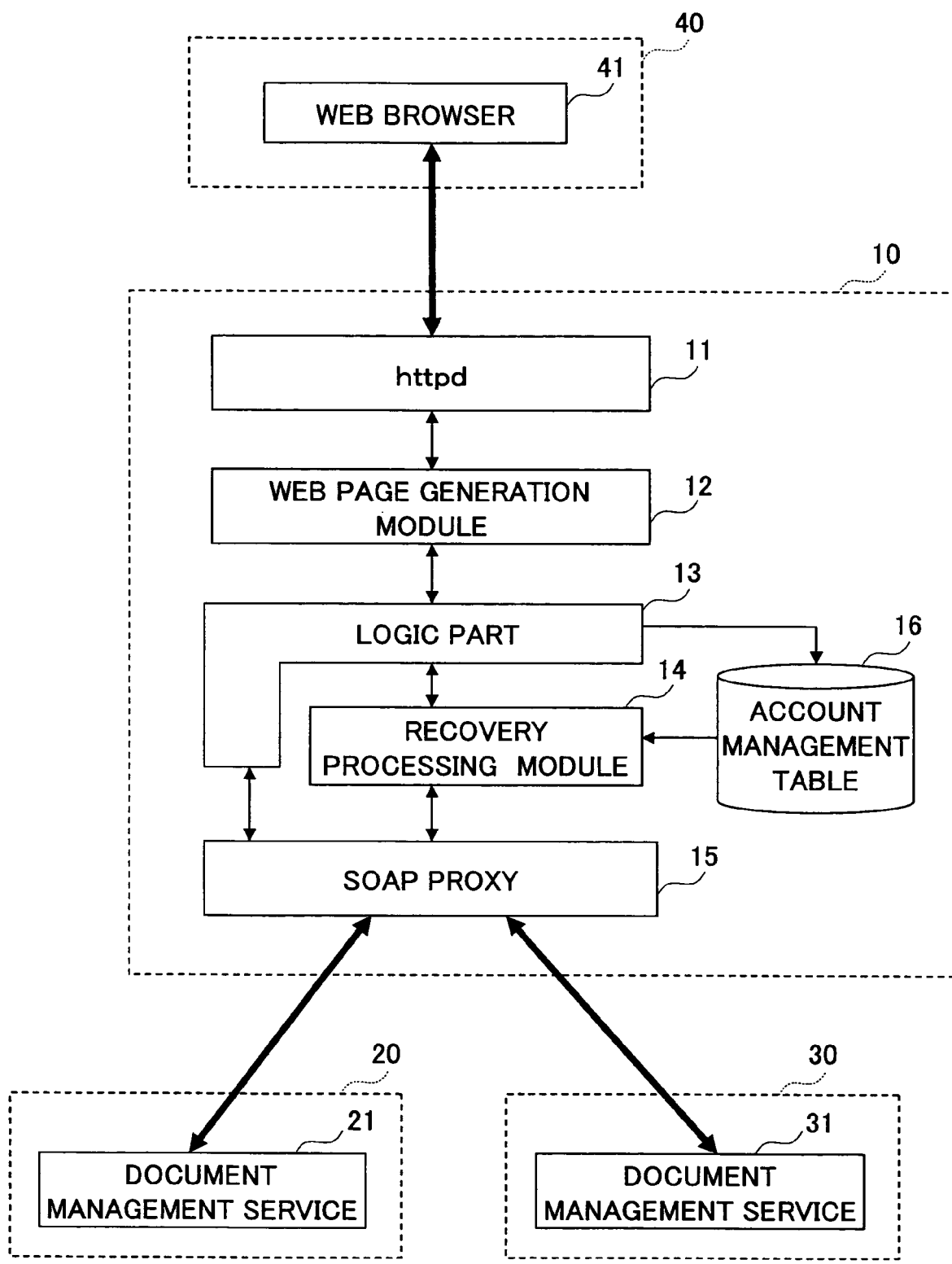
FIG. 4 shows an exemplary functional structure of a document management system according to a first embodiment of the present invention.

FIG. 4 shows an exemplary functional structure of a document management system according to a first embodiment of the present invention.

Referring to FIG. 4, the Web server 10 includes an httpd (HyperText Transfer Protocol Daemon) 11, a Web page generation module 12, a logic part 13, a recovery processing module 14, a SOAP (Simple Object Access Protocol) proxy 15 and an account management table 16.

The httpd 11 is a daemon program that receives an HTTP request from the terminal 40 and requests the Web page generation module 12 to generate a Web page including information requested in the HTTP request. The httpd 11 receives the generated Web page as an HTTP response, and then sends the HTTP response including the Web page to the terminal 40.

The Web page generation module 12 executes a process for generating a Web page requested by the terminal 40. The logic part 13 includes at least one logic element to generate or obtain information included in the requested Web page, and supplies the obtained information as a process result to the Web page generation module 12.

The recovery processing module 14, after a session between the Web server 10 and the document management server 20 or 30 is invalidated due to timeout or other reasons, executes a recovery process for the session.

The SOAP proxy 15 is a module that provides the logic part 13 with a method interface to call a function of the document management server 20 or 30. In response to calling of a method from the logic part 13, the SOAP proxy 15 sends to the document management server 20 or 30 a SOAP message for requesting execution of a process corresponding to the method.

The account management table 16 is a table for maintaining authentication information, such as user names and passwords, supplied from the terminal 40 by users.

The document management servers 20 and 30 include document management services 21 and 31, respectively. The document management services 21 and 31 are for providing document management functions as Web services. In response to receipt of a SOAP message from the Web server 10, the document management services 21 and 31 perform a process corresponding to the SOAP message and send the process result as a SOAP message to the Web server 10.

Figure 5:
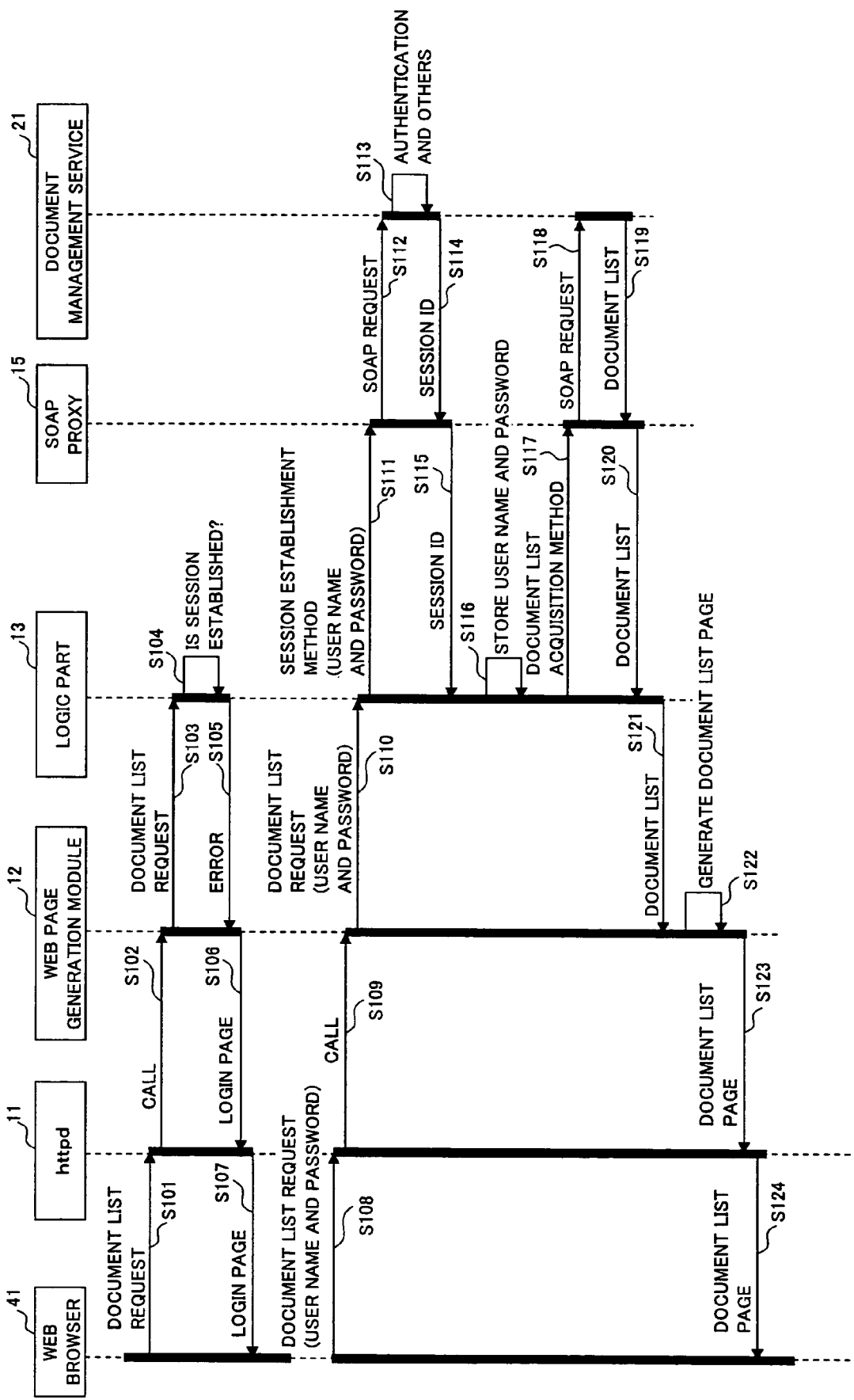
FIG. 5 is a sequence diagram of an exemplary session recovery process of a document management system according to the first embodiment.
Figure 6:
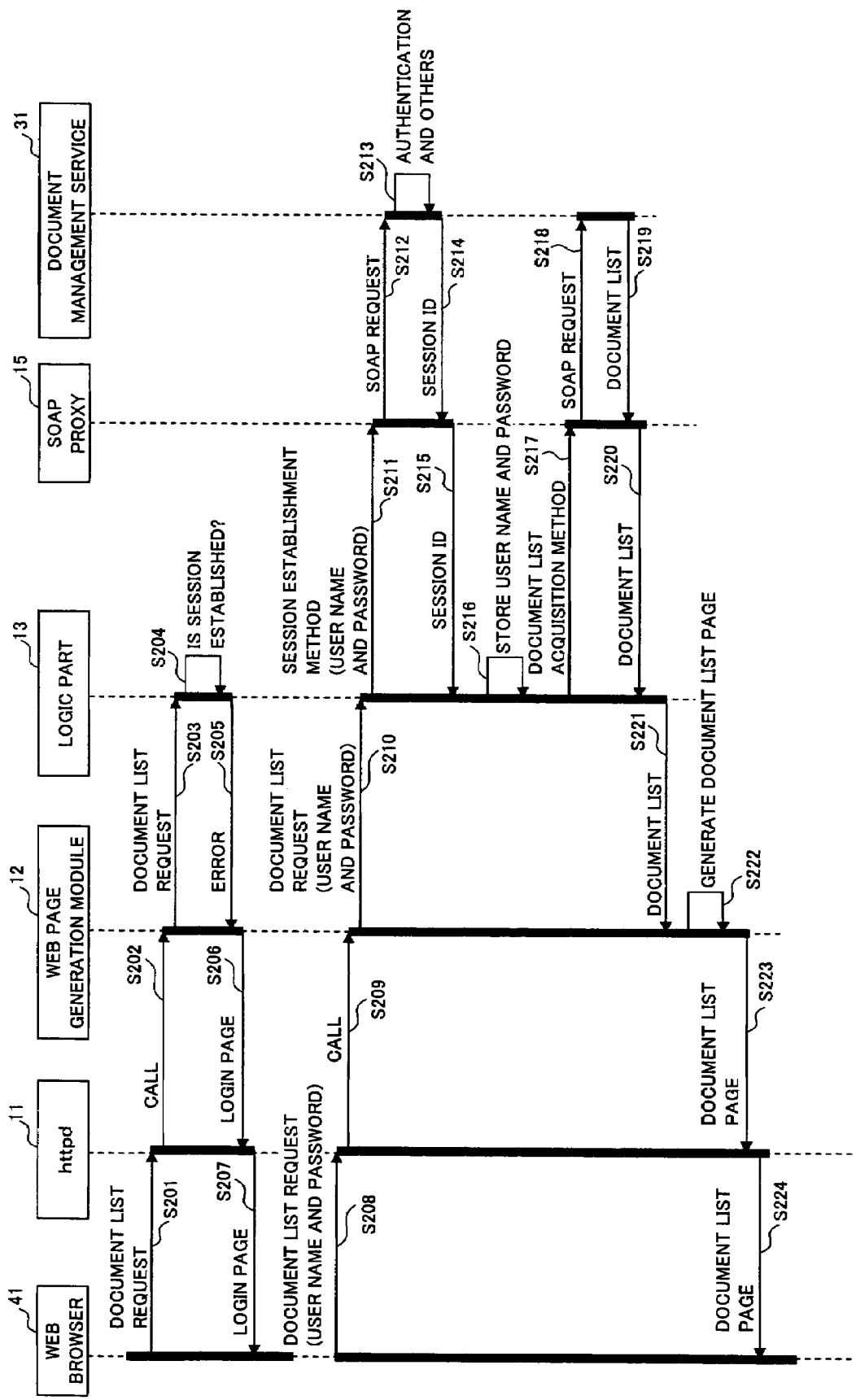
FIG. 6 is a sequence diagram of another exemplary session recovery process of a document management system according to the first embodiment.
Figure 7:
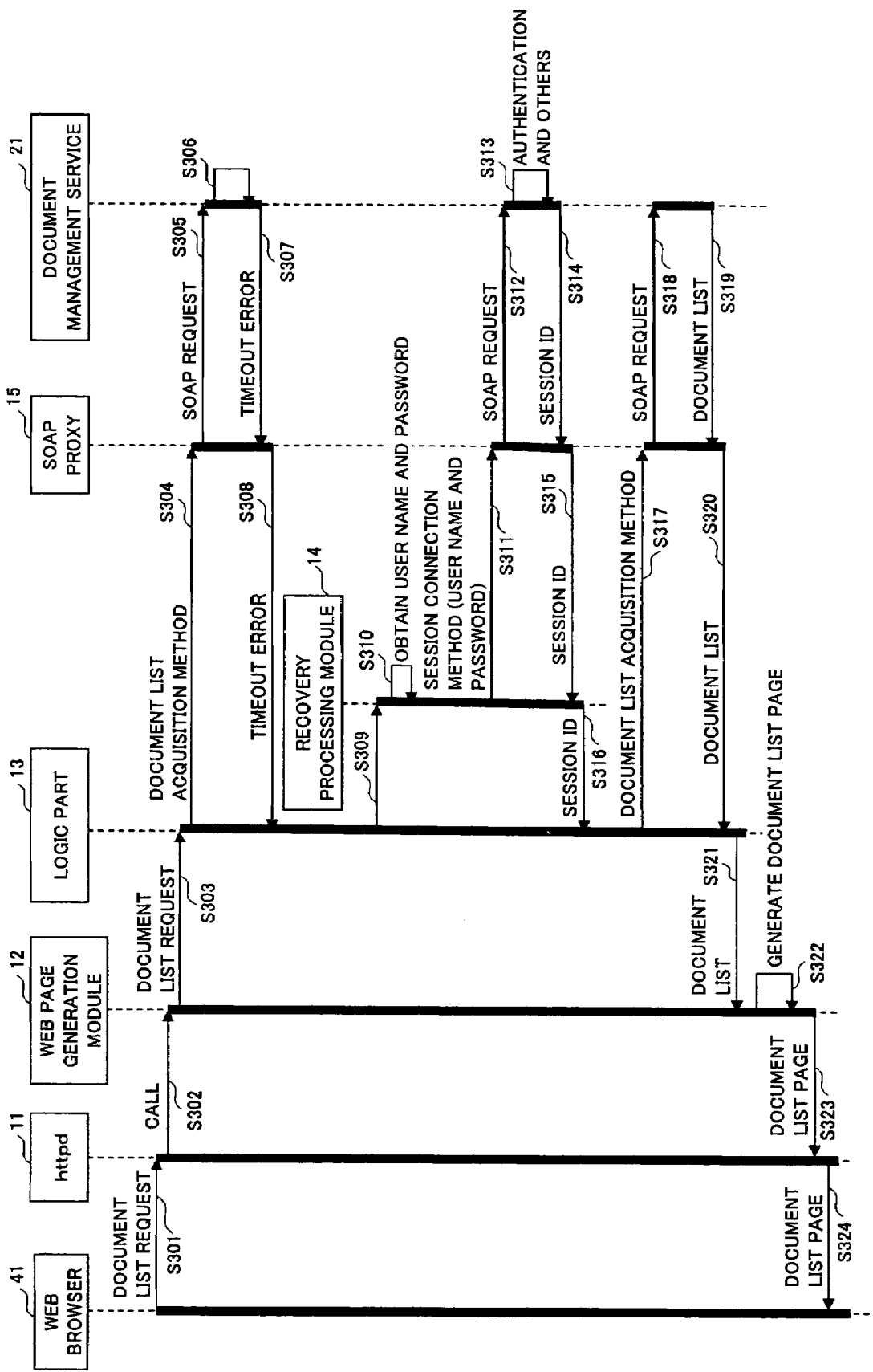
FIG. 7 is a sequence diagram of another exemplary session recovery process of a document management system according to the first embodiment.

In the following, an exemplary operation of a document management system is described. FIG. 5 through FIG. 7 are sequence diagrams to explain an exemplary session recovery operation of a document management system according to the first embodiment.

Referring to FIG. 5, when a user of the terminal 40 inputs to the Web browser 41 a URL (Uniform Resource Locator) associated with a Web page accommodating a list of document data included in the document management server 20, which is referred to as a "document list page" hereinafter, so as to refer to the list of document data managed under the document management server 20, the Web browser 41 sends to the Web server 10 an HTTP request for requesting the Web sever 10 to send the document list page at step S101.

At step S102, when the httpd 11 receives the HTTP request and calls the Web page generation module 12, the Web page generation module 12 requests the logic part 13 to obtain the document list in the document management server 20 at step S103.

At step S104, the logic part 13 determines whether a session with the document management server 20 has been established. Now, it is supposed that the session with the document management server 20 has not been established yet. Thus, the logic part 13 informs the Web page generation module 12 of error information indicating that the logic part 13 cannot access the document management server 20 because the session has not been established at step S105.

At step S106, the Web page generation module 12 supplies to the httpd 11 a Web page for prompting the user to input the user name and the password necessary, which is referred to as a "login page" hereinafter, to establish the session with the document management server 20 based on the received error information.

At step S107, when the httpd 11 sends the login page to the Web browser 41, the Web browser 41 displays the login page.

At step S108, when the user inputs the user name and the password to access the document management server 20 in the login page, the Web browser 41 sends to the Web server 10 an HTTP request for requesting the Web server 10 to send the document list page together with the user name and the password.

At step S109, when the httpd 11 calls the Web page generation module 12, the Web page generation module 12 requests the logic part 13 to obtain the document list by submitting the user name and the password at step S110.

At step S111, the logic part 13 uses RPC (Remote Procedure Call) of SOAP to call a session establishment method of the document management service 21 in the document management server 20 via the SOAP proxy 15. When the logic part 13 calls the session establishment method via the SOAP proxy 15 at step S111, the SOAP proxy 15 sends to the document management service 21 a SOAP message including call information on the session establishment method of the document management service 21 as a SOAP request at step S112. It is noted that the user name and the password from the Web browser 41 are designated in an argument of the session establishment method.

At step S113, the document management service 21 authenticates the user based on the user name and the password in the SOAP request, and if the user is successfully authenticated, the document management service 21 establishes a session with the Web server 10.

When the document management service 21 sends to the SOAP proxy 15 a SOAP message including a session ID of the newly established session as a SOAP response at step S114, the SOAP proxy 15 retrieves the session ID from the SOAP response and, in turn, supplies the session ID to the logic part 13 at step S115.

At step S116, the logic part 13, in response to successful establishment with the document management service 21, registers the user name and the password for the session establishment in the account management table 16.

FIG. 8 shows an exemplary data structure of the account management table 16 according to the first embodiment.

Referring to FIG. 8, the account management table 16 includes data items such as "SERVICE NAME", "USER NAME" and "PASSWORD". "SERVICE NAME" is an item for registering the name of a Web service associated with an established session. In this embodiment, since the session with the document management service 21 is established, the data "document management service 21 " is registered in SERVICE NAME. USER NAME and PASSWORD are the user name and the password, respectively, of the user associated with the session with the document management service 21. The account management table 16 keeps user names and passwords used to establish sessions with individual Web services.

By using RPC of SOAP to call a method for acquiring the document list of the document management service 21 via the SOAP proxy 15 based on the session ID of the established session at step S117, the logic part 13 requests the document management service 21 to provide the document list managed in the document management server 20 at step S118.

When the document management service 21 sends to the SOAP proxy 15 a SOAP message including the document list as a SOAP response at step S119, the SOAP proxy 15 retrieves the document list from the SOAP response, and supplies the document list to the logic part 13 at step S120.

When the logic part 13 supplies the document list to the Web page generation module 12 at step S121, the Web page generation module 12 generates a document list page for displaying the document list at step S122.

When the Web page generation module 12 supplies the document list page to the httpd 11 at step S123, the httpd 11, in turn, sends the document list page to the Web browser 41 at step S124. The Web browser 41 displays the document list page, and the user can view the document list managed in the document management server 20.

Now, it is supposed that the user attempts to view a document list of one or more document management servers other than the document management server 20 (the document management server 30 in case of this embodiment), for example, because there is no desired document data in the document list in the just displayed document list page.

Referring to FIG. 6, when the user supplies to the Web browser 41 URL for a document list page to demonstrate a list of documents in the document management server 30, the Web browser 41 sends an HTTP request for requesting the Web server 10 to send the document list page at step S201.

Subsequently, similar operations to steps S102 through S124 are performed on the document management server 30 at steps S202 through S224. As a result, a new session is established between the Web server 10 and the document management service 31, and the Web browser 41 displays the document list page to demonstrate the document list in the document management server 30.

Here, it is supposed that the user attempts to view the document list of the document management server 20 after some operations (printing, distributing or the like) on document data of the document management server 30 via the document list page for a while.

Referring to FIG. 7, when the user supplies to the Web browser 41 URL for a document list page to demonstrate the document list of the document management server 20 as in step S101, the Web browser 41 sends to the httpd 11 an HTTP request for requesting the Web server 10 to send the document list page at step S301.

When the httpd 11 calls the Web page generation module 12 at step S302, the Web page generation module 12 requests the logic part 13 to obtain the document list of the document management server 20 at step S303.

Since a session with the document management server 20 has been established, the logic part 13 uses RPC of SOAP to call the document list acquisition method of the document management service 21 via the SOAP proxy 15 at steps S304 and S305.

At step S306, the document management service 21 determines whether the session with the Web server 10 has been invalidated due to timeout or other reasons. Now, it is supposed that the session has been timed out during the manipulation on document data of the document management server 30. Thus, the document management service 21 informs the SOAP proxy 15 of a SOAP message including error information (timeout error) indicating that the session has been timed out as a SOAP response at step S307.

At step S308, the SOAP proxy 15 retrieves the error information from the SOAP response and supplies the retrieved error information to the logic part 13 at step S308. In response to receipt of the error information, the logic part 13 determines that the session has been invalidated based on the error information.

Conventionally, the user is required to input the user name and the password in the login page by supplying an error to the Web page generation module 12 as in step S106 (FIG. 5). In this embodiment, however, the logic part 13 requests the recovery process module 14 to perform a recovery process for the session with the document management service 21 without outputting of any error to the Web page generation module 12 at step S309.

At step S310, the recovery module 14 obtains the user name and the password registered at step S116 for the document management service 21 from the account management table 16.

The recovery processing module 14 uses RPC of SOAP to call a session establishment method of the document management service 21 by supplying the user name and the password as arguments (S311 and S312).

At step S313, the document management service 21 authenticates the user based on the user name and the password, and if the user is successfully authenticated, the session with the Web server 10 is established again.

When the document management service 21 sends to the SOAP proxy 15 a SOAP message including a session ID of the newly established session as a SOAP response at step S314, the SOAP proxy 15 retrieves the session ID from the SOAP response, and supplies the session ID to the recovery processing module 14 at step S315.

At step S316, the recovery processing module 14, in turn, supplies the session ID to the logic part 13.

Subsequently, the similar operations to steps S117 through S124 are performed on the newly established session, and the document list page including the document list of the document management server 20 is displayed on the Web browser 41 at steps S317 through S324.

As mentioned above, the Web server 10 according to the first embodiment maintains the authentication information, such as previously input user names and passwords, in the account management table 16. Thus, even if the session with the document management service 21 or 31 is invalidated, the authentication information can be used to request the document management service 21 or 31 to establish the session again. As a result, it is possible to resume the session without user's recognition of the invalidation of the session.

Notably, it may not be preferable to maintain user names and passwords in the account management table 16 from the viewpoint of security. In such a case, the user names and the passwords may be encrypted. Alternatively, the time period may be set to maintain the user names and the passwords, and the user names and the passwords may be deleted after the time period expires.

A description is given, with reference to FIG. 9 through FIG. 16, of a document management system according to a second embodiment of the present invention.

After a session between the Web server 10 and the document management service 21 or 31 is invalidated, the terminal 40, which does not recognize that the session has been invalidated, may request execution of a process dependent on a result of a process executed before the invalidation of the session. For example, this process may include a narrowing process for listed documents obtained from a search process executed before the session is invalidated. In such a case, information cashed in the document management service 21 as information necessary for execution of the previous process is completely cleared. Thus, even if the session is simply resumed, it is impossible to execute the previous operation dependent process requested by the terminal 40. For this reason, the user of the terminal 40 is required to perform manipulation again previously performed by the user until invalidation of the session. The second embodiment is designed to address this problem. The second embodiment is designed in such a way that a process requested by the terminal 40 after the session invalidation, in addition to the session recovery, can be continuously executed based on the status just before the session invalidation.

Figure 9:
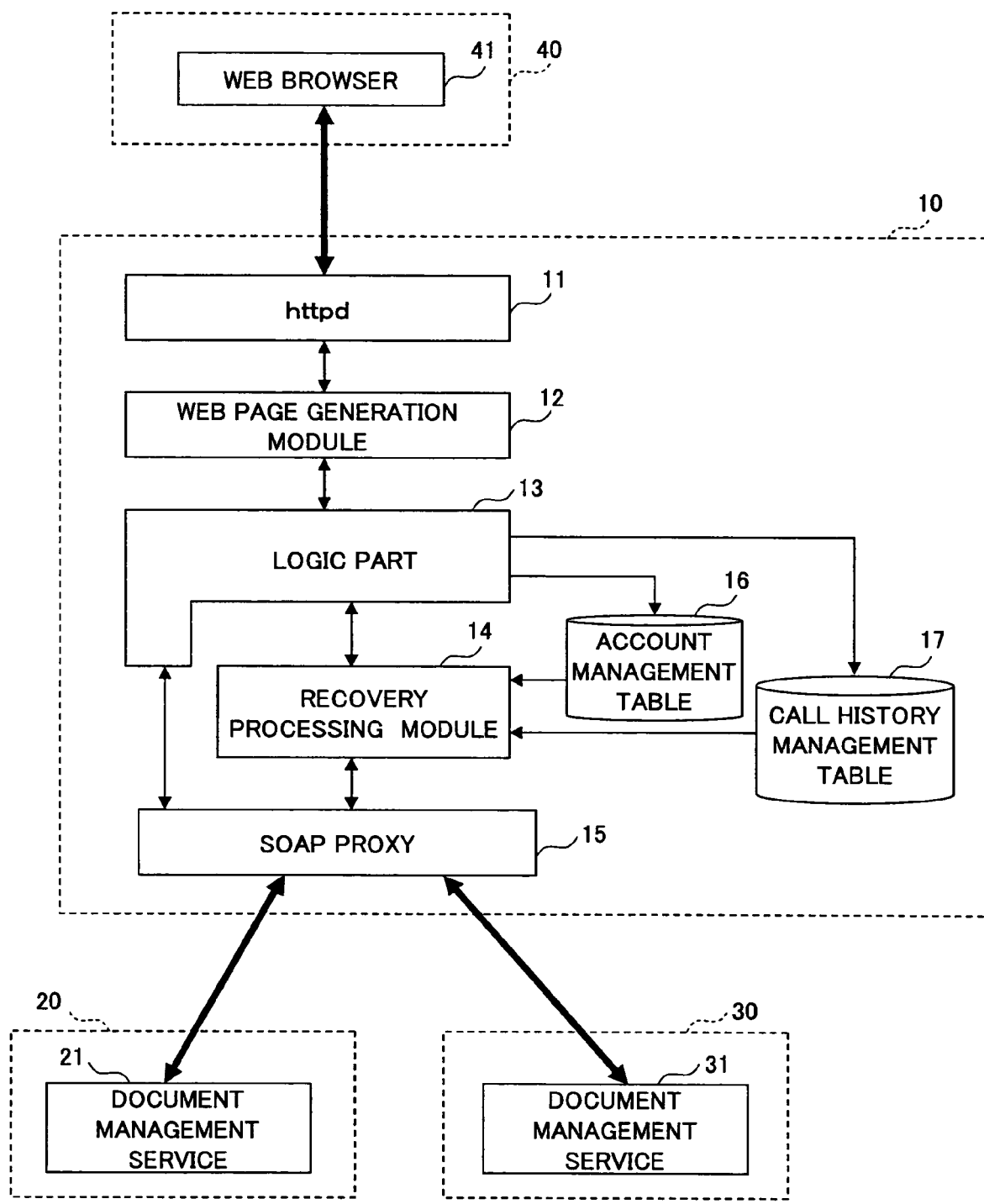
FIG. 9 shows an exemplary functional structure of a document management system according to a second embodiment of the present invention.

FIG. 9 shows an exemplary functional structure of a document management system according to the second embodiment. In FIG. 9, the same parts and elements as those in FIG. 4 are designated by the same reference numerals, and the description thereof is omitted.

Referring to FIG. 9, a Web server 10 further includes a call history management table 17. The call history management system 17 is a table to maintain history of call information on various methods of the document management services 21 and 31 previously called by the logic part 13 via the SOAP proxy 15.

An exemplary operation of the document management system shown in FIG. 9 is described with reference to FIG. 10 through FIG. 13. FIG. 10 through FIG. 13 are sequence diagrams to explain exemplary recovery processes of a document management system according to the second embodiment.

Figure 10:
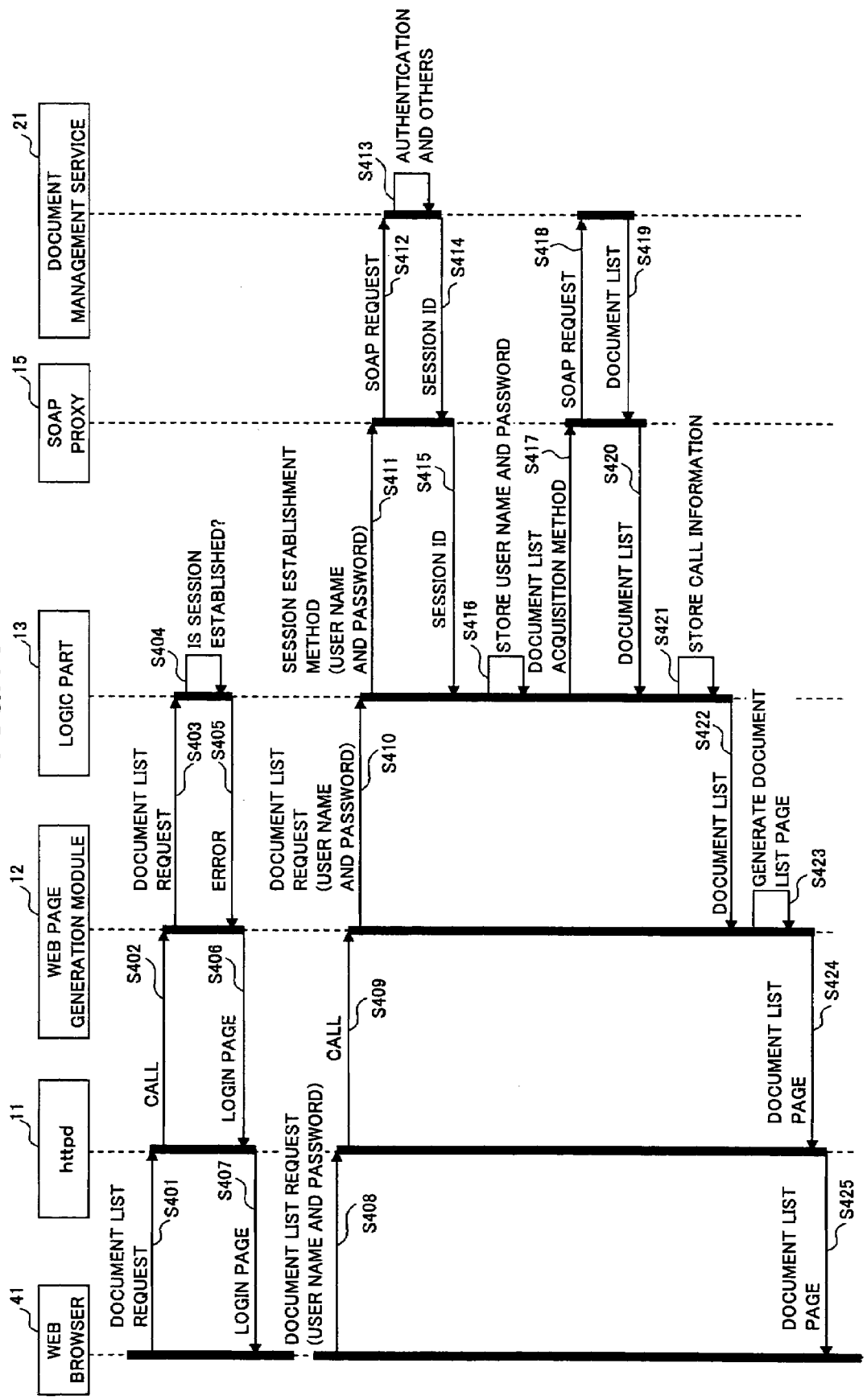
FIG. 10 is a sequence diagram of an exemplary session recovery process of a document management system according to the second embodiment.

Referring to FIG. 10, in the almost same way as the procedure in FIG. 5, in response to a request for a document list page from the Web browser 41 at step S401, a session is established between the Web server 10 and the document management service 21 at steps S411 through S415, and the document list page to demonstrate a list of documents searched for by the document management service 21 is provided to the Web browser 41 at steps S417 through S425. At this time, a user name and a password used to establish the session with the document management service 21 are registered in the account management table 16 at step S416. As an additional process in FIG. 10, after the logic part 13 calls a document list acquisition method of the document management service 21 via the SOAP proxy 15, the call information on the document list acquisition method is registered in the call history management table 17 at step S421.

FIG. 14 shows an exemplary data structure of a call history management table according to the second embodiment.

Referring to FIG. 14, the call history management table 17 includes data items such as "SERVICE NAME", "METHOD NAME" and "ARGUMENT INFORMATION". SERVICE NAME is the name of a Web service calling a method. METHOD NAME is the name of a called method. ARGUMENT INFORMATION is an argument value designated by a relevant method at time of calling the method. In FIG. 14, the call information corresponding to calling of the document list acquisition method of the document management service 21 is registered. Here, for example, the illustrated argument information may correspond to search conditions.

Figure 11:
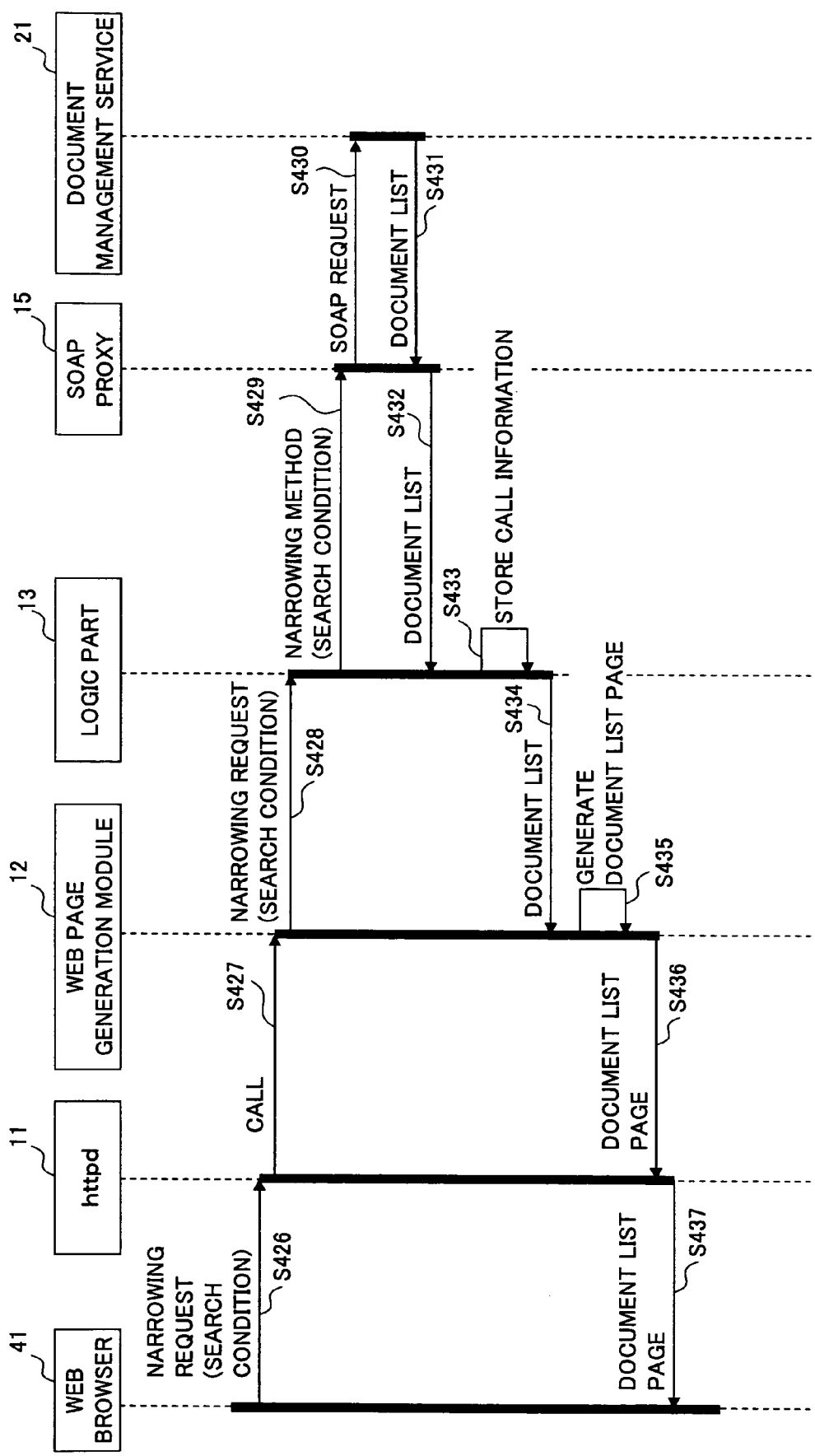
FIG. 11 is a sequence diagram of another exemplary session recovery process of a document management system according to the second embodiment.

Referring to FIG. 11, when the user instructs a narrowing process by designating a new search condition in the document list page, the Web browser 41 sends an HTTP request for requesting the narrowing process to the Web server 10 at step S426. In response to receipt of the HTTP request from the Web browser 41, the httpd 11 calls the Web page generation module 12 at step S427. Then, the Web page generation module 12 instructs the logic part 13 to execute the narrowing process at step S428. The logic part 13 calls a narrowing method of the document management service 21 via the SOAP proxy 15, and obtains a document list as the result of the narrowing process at steps S429 through S432.

At step S433, the logic part 13 registers the call information on the narrowing method, which is called at step S429, in the call history management table 17. As a result of the registration, the call information at document list acquisition time and the call information at narrowing time have been registered. Subsequently, the document list page is generated based on the document list, and is sent to the Web browser 41 at steps S434 through S437. Here, if the user instructs a further narrowing process in the document list page, steps S426 through S437 are repeated, and a new record is added to the call history management table 17.

Here, for example, it is supposed that the session between the Web server 10 and the document management service 21 has been invalidated due to timeout or trouble of the document management server 20. It is noted that even if the session is invalidated, the document list page indicative of the narrowing result is still displayed in the Web browser 41 of the terminal 40. Thus, the user cannot recognize the session invalidation.

Figure 12:
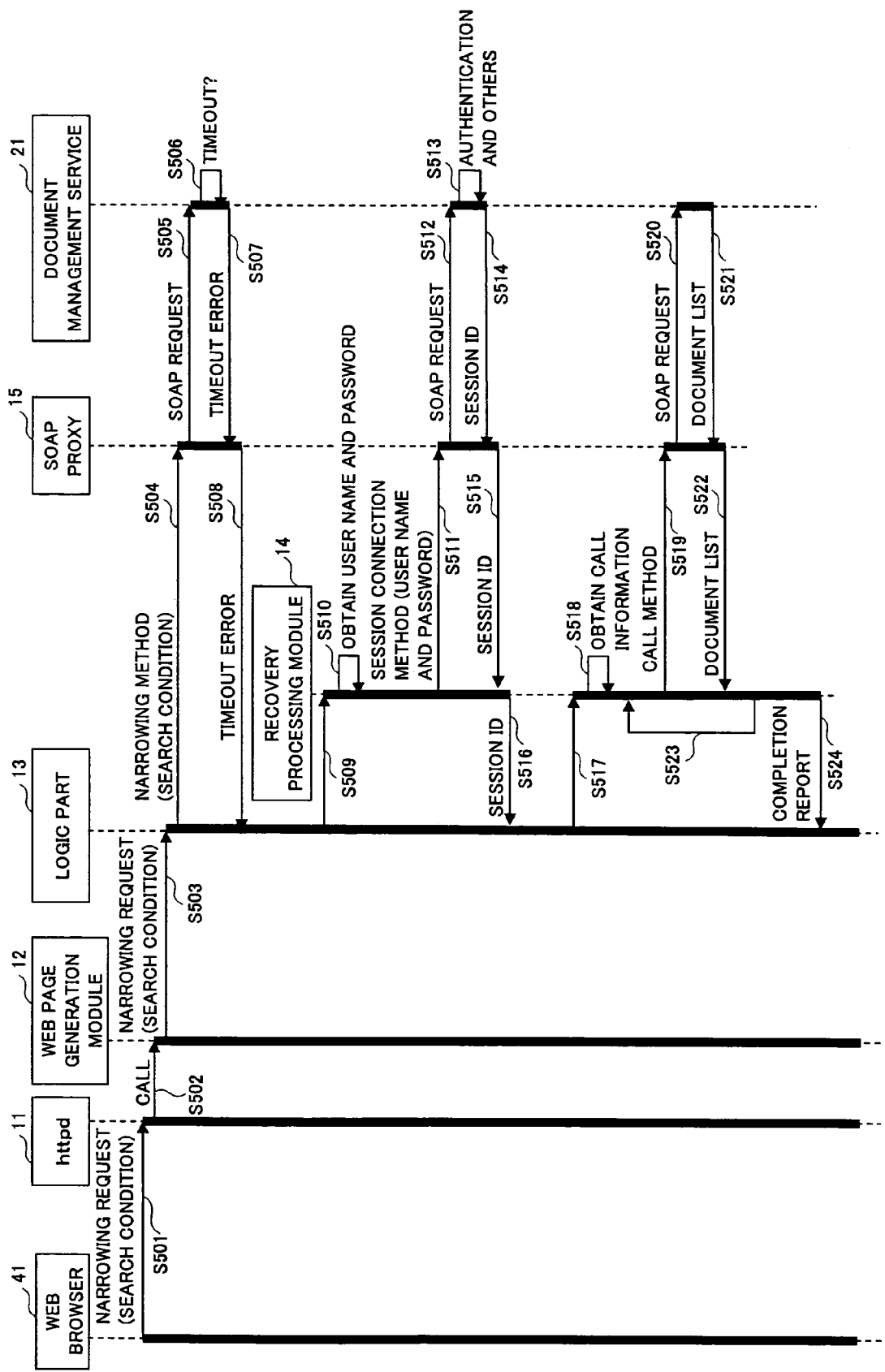
FIG. 12 is a sequence diagram of another exemplary session recovery process of a document management system according to the second embodiment.

At this time, if the user instructs the further narrowing process, the process control moves to step S501 in FIG. 12.

Referring to FIG. 12, when the narrowing method of the document management service 21 is called based on an HTTP request from the Web browser 41 at steps S501 through S505, the document management service 21 detects that the session with the Web server 10 has been invalidated, for example, due to timeout, at step S506, and sends a report indicative of the session invalidation, for example, a timeout error, to the SOAP proxy 15 at step S507. The timeout error is reported from the SOAP proxy 15 to the logic part 13 at step S508.

When the logic part 13 requests the recovery processing module 14 to perform a session recovery process on the session with the document management service 21 at step S509, the recovery processing module 14 performs the session recovery process in accordance with the same procedure as steps S310 through S316 at steps S510 through S516.

At step S517, the logic part 13 requests the recovery processing module 14 to perform the session recovery process so that the session can be resumed to return to the status immediately before the session invalidation. For example, this is why the currently requested narrowing process is based on the previously searched result.

When the recovery processing module 14 obtains the earliest call information from the call history management table 17 at step S518, the recovery processing module 14 identifies a document management service having a target method to be called and the method name and argument information of the target method based on the obtained call information, and calls the target method (the document list acquisition method or the narrowing method) at step S519. The SOAP proxy 15 sends this method call as a SOAP request to the document management service 21 at step S520.

At step S521, the document management service 21 performs a process corresponding to the called method, for example, a process to search for a document list, and then sends the process result, such as the detected document list, to the SOAP proxy 15. At step S522, the SOAP proxy 15 supplies the document list to the recovery processing module 14.

If the above steps S519 through S522 are repeatedly executed times corresponding to the number of records of call information registered in the call history table 17 at step S523, the recovery processing module 14 informs the logic part 13 that the status recovery process has been completed at step S524.

In response to the status recovery, the logic part 13 starts the requested narrowing process. Specifically, the narrowing process is performed in accordance with the same procedure as steps S429 through S437 explained with reference to FIG. 11, and a document list page indicative of the search result is sent to the Web browser 41 at steps S525 through S533 in FIG. 13.

Figure 13:
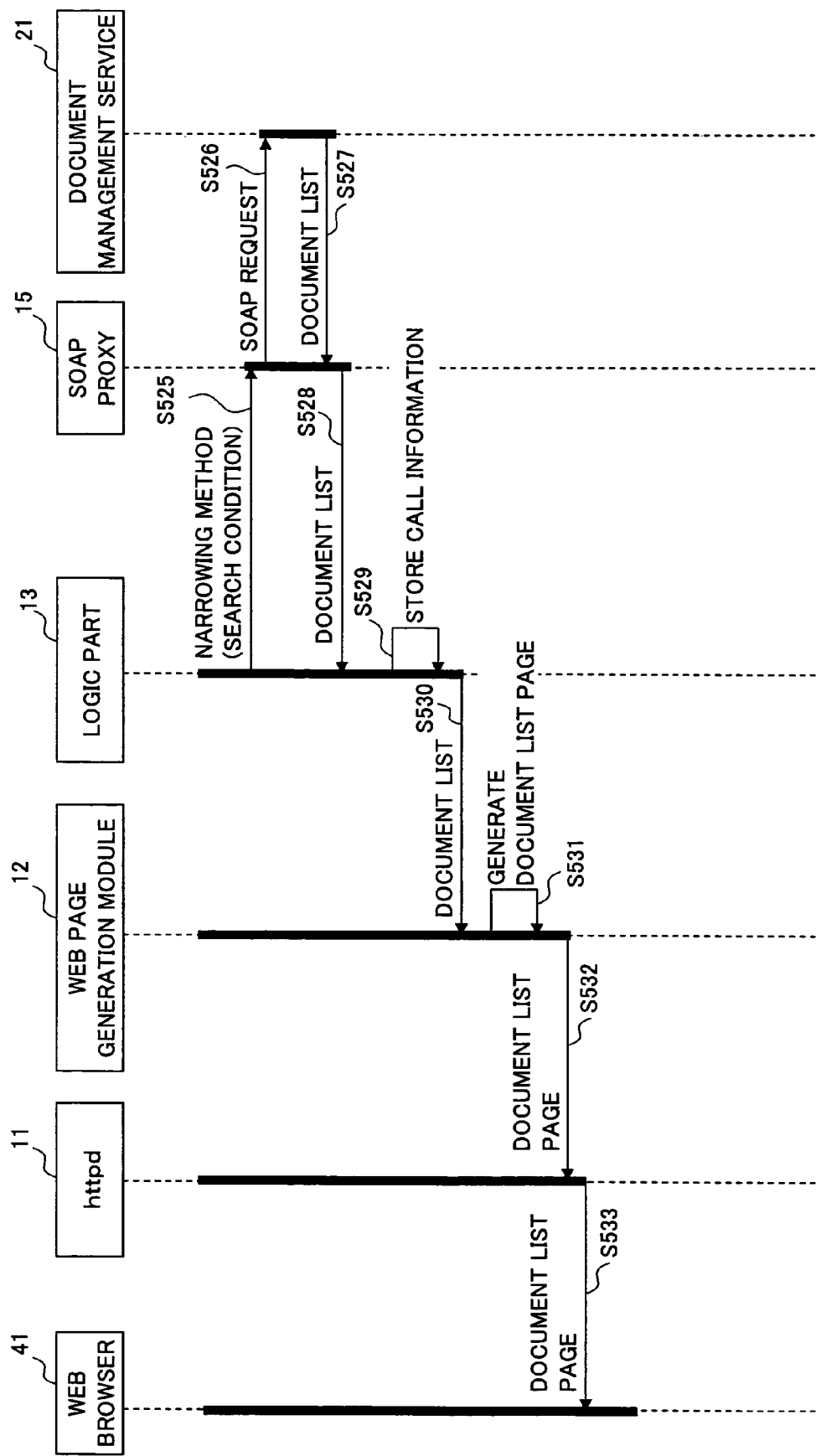
FIG. 13 is a sequence diagram of another exemplary session recovery process of a document management system according to the second embodiment.
Figure 15:
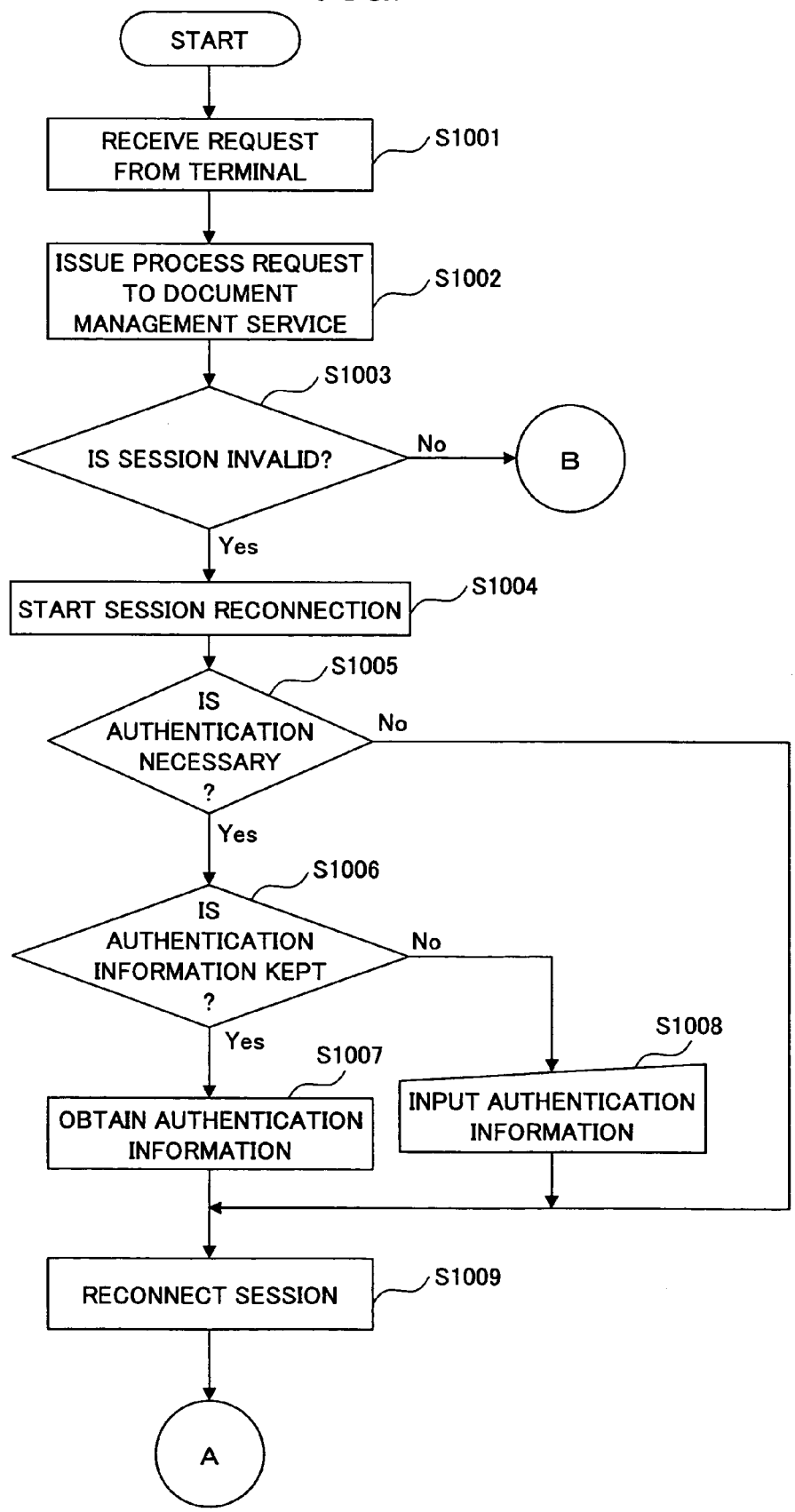
FIG. 15 is a portion of a flowchart of an exemplary status recovery process according to the second embodiment.
Figure 16:
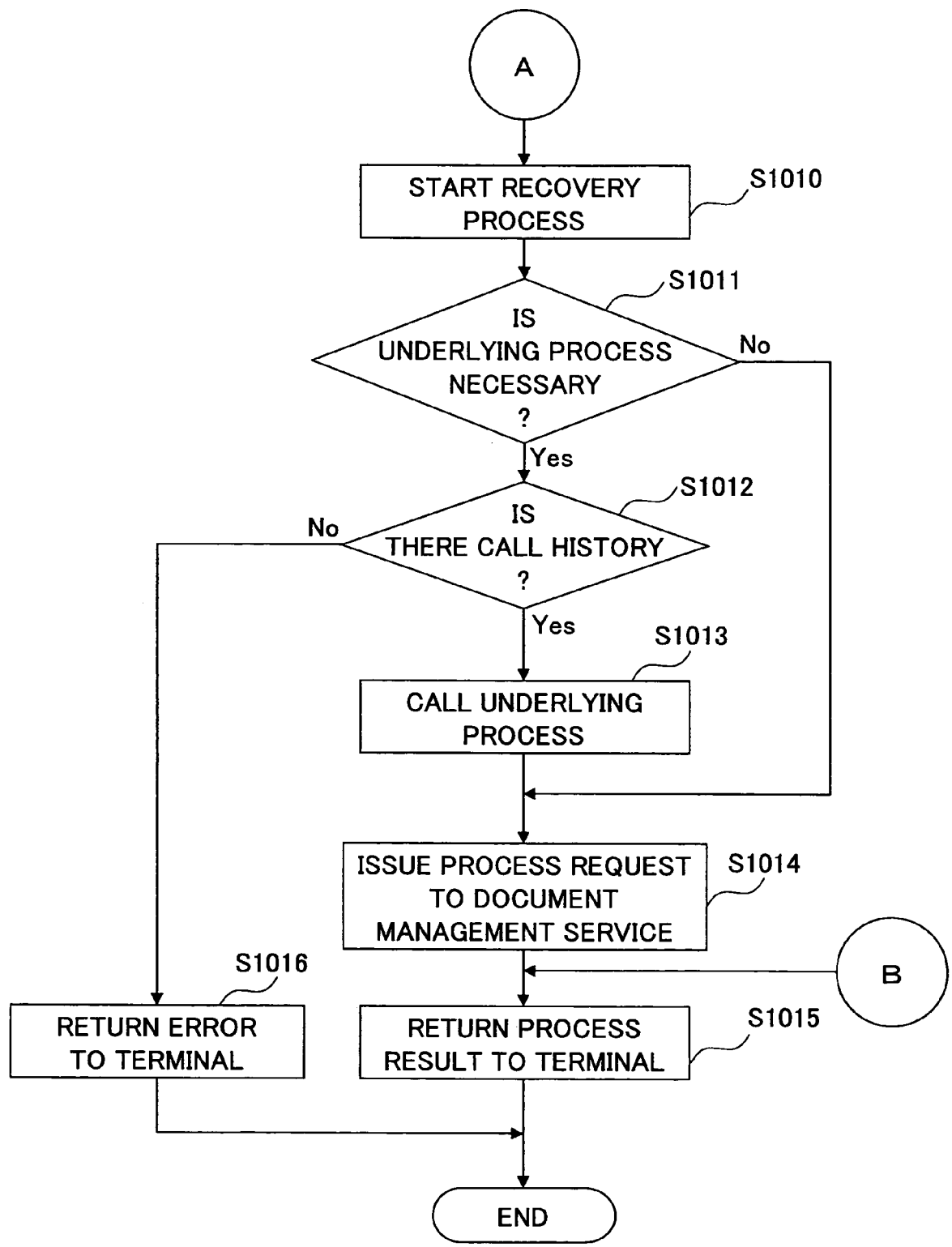
FIG. 16 is the other portion of a flowchart of an exemplary status recovery process according to the second embodiment.

The recovery process in FIG. 12 and FIG. 13 is described with reference to a flowchart so as to explain details of branching conditions. FIG. 15 and FIG. 16 collectively show a flowchart of a status recovery process according to an embodiment of the present invention.

Referring to FIG. 15, when receiving a request for a narrowing process from the terminal 40 (Web browser 41) at step S1001, the logic part 13 requests the document management service 21 to perform the requested narrowing process at step S1002. At step S1003, the logic part 13 determines whether the session has been invalidated, for example, due to timeout, based on a response from the document management service 21. If the session is valid (S1003: No), the process result, such as a document list, from the document management service 21 is sent to the Web browser 41 as a Web page at step S1015 in FIG. 16.

On the other hand, if the session has been invalidated (S1003: Yes), the logic part 13 requests the recovery processing module 14 to resume the session at step S1004. At step S1005, the recovery processing module 14 determines whether the user should be authenticated to establish the session. If the authentication is not necessary (S1005: No), the session with the document management service 21 is resumed by calling the session establishment method of the document management service 21 without any action for the authentication at step S1009.

On the other hand, if the authentication is necessary (S1005: Yes), the recovery processing module 14 checks whether authentication information, such as the user name and the password, is registered in the account management table 16 at step S1006. If the authentication information is registered in the account management table 16 (S1006: Yes), the recovery processing module 14 obtains the authentication information from the account management table 16, and establishes the session with the document management service 21 based on the authentication information again at step S1009. On the other hand, if the authentication information is not registered in the account management table 16,(S1006: No), a login page is sent to the Web browser 41, and the session is established again based on authentication information supplied via the login page at steps S1008 and S1009.

When the session is resumed, the status recovery process is performed at S1010 in FIG. 16. Specifically, the recovery processing module 14 determines whether some underlying process of the process requested by the Web browser 41 should be executed at step S1011. If there is no necessary underlying process (S1011: No), the document management service 21 is instructed to execute the requested process at S1014.

On the other hand, if there is some necessary underlying process (S1011: Yes), the recovery processing module 14 checks whether call information corresponding to the underlying process is registered in the call history management table 17 at step S1012. If the corresponding call information is registered (S1012: Yes), the recovery processing module resumes the status by calling a method corresponding to the underlying process, such as the document list acquisition method and the narrowing method, at step S1013. When the status is recovered, the logic part 13 requests the document management service 21 to perform the process requested by the Web browser 41 at step S1014. At step S1015, in response to receipt of the process result, such as the document list, from the document management service 21, the logic part 13 sends the process result as a Web page to the Web browser 41.

On the other hand, if the call information is not registered in the call history management table 17 (S1012: No), an error message is sent to the Web browser 41 at step S1016 because of difficulty of the status recovery in this case.

According to the second embodiment, it is possible to automatically resume the status immediately before the session is invalidated. Thus, even if the terminal 40 requests a process that needs such an immediately before status, it is possible to execute the requested process without user's recognition of the session invalidation.

When call information is resumed by tracing back up to a number of call information records, for example, a transaction unit is defined (programmed) in the logic part 13 in advance, and the logic part 13 may delimit records in the call history management table 17 in accordance with the definition. Alternatively, the Web page generation module 12, which generates a Web page supplied to the Web browser 41, may determine the transaction unit and instruct the logic part 13 to start and terminate recording of the call information.

Also, the call information in the call history management table 17 may be registered in an encrypted form in terms of security. Alternatively, once a call information record becomes unnecessary, the call information record may be accordingly deleted.

The present invention is not limited to the specifically disclosed embodiments, and variations and modifications may be made without departing from the scope of the present invention.

The present application is based on Japanese Patent Priority Applications No. 2003-294422 filed Aug. 18, 2003 and No. 2004-181383 filed Jun. 18, 2004, the entire contents of which are hereby incorporated by reference.

What is claimed is:

1. An information processing apparatus for establishing a session with a server apparatus connected thereto via a network and communicating to the server apparatus based on the session, comprising:
   an authentication information maintaining part configured to maintain authentication information supplied to establish the session;
   a session invalidation detection part configured to detect that the session is invalidated; and
   a session recovery part, when the session invalidation detection part detects that the session has been invalidated, configured to request the server apparatus to restart the invalidated session by using the authentication information in the authentication information maintaining part.

2. The information processing apparatus as claimed in claim 1, wherein the authentication information comprises a user name and a password of a user.

3. The information processing apparatus as claimed in claim 1, wherein the authentication information maintaining part is configured to maintain the authentication information in association with the server apparatus associated with the session.

4. The information processing apparatus as claimed in claim 1, wherein the session invalidation detection part, if a response from the server apparatus in the session indicates that the session is timed out, is configured to determine that the session is invalidated.

5. The information processing apparatus as claimed in claim 1, further comprising:
   a request history maintaining part configured to maintain history information on a process request for the server apparatus based on the session,
   wherein the session recovery part, based on the recovered session, is configured to issue to the server apparatus the process request represented in the history information in the request history maintaining part.

6. The information processing apparatus as claimed in claim 5, wherein the history information on the process request issued to the server apparatus comprises a history of call information on a method to send the process request to the server apparatus.

7. The information processing apparatus as claimed in claim 6, wherein the call information on the method includes a method name and argument information of the method.

8. The information processing apparatus as claimed in claim 1, wherein the server apparatus provides at least one function thereof as a Web service.

9. A method of recovering a session for an information processing apparatus for establishing a session with a server apparatus connected thereto via a network and communicating to the server apparatus based on the session, the method comprising steps of:
   maintaining authentication information supplied to establish the session;
   detecting that the session is invalidated; and
   requesting, when it is detected in the session invalidation detection step that the session has been invalidated, the server apparatus to restart the invalidated session by using the authentication information maintain in the authentication information maintaining step.

10. The method as claimed in claim 9, further comprising steps of:
    maintaining history information on a process request issued to the server apparatus based on the session; and issuing to the server apparatus the process request represented in the history information maintained at the history information maintaining step based on the session established at the session establishment requesting step.

11. A recording medium for storing a program to cause a computer to execute a procedure, the procedure comprising steps of:

maintaining authentication information supplied to establish a session with a server apparatus connected via a network;

detecting that the session is invalidated; and requesting, when it is detected in the session invalidation detection step that the session has been invalidated, the server apparatus to restart the invalidated session by using the authentication information maintained in the authentication information maintaining step.

12. The recording medium as claimed in claim 11, wherein the procedure further comprises steps of:

maintaining history information on a process request issued to the server apparatus based on the session; and issuing to the server apparatus the process request represented in the history information maintained at the history information maintaining step based on the session established at the session establishment requesting step.

* * * * *